United States Patent
Yang et al.

(10) Patent No.: US 7,615,094 B2
(45) Date of Patent: Nov. 10, 2009

(54) TUNGSTEN-BASED SINTERED MATERIAL HAVING HIGH STRENGTH AND HIGH HARDNESS, AND HOT PRESS MOLD USED FOR OPTICAL GLASS LENSES

(75) Inventors: Ji-bin Yang, Susono (JP); Masato Otsuki, Susono (JP)

(73) Assignee: Mitsubishi Materials C.M.I. Corporation, Shizuoka-Ken (JP)

( * ) Notice: Subject to any disclaimer, the term of this patent is extended or adjusted under 35 U.S.C. 154(b) by 151 days.

(21) Appl. No.: 10/598,585

(22) PCT Filed: Jul. 13, 2004

(86) PCT No.: PCT/JP2004/010278

§ 371 (c)(1),
(2), (4) Date: Dec. 14, 2006

(87) PCT Pub. No.: WO2005/085486

PCT Pub. Date: Sep. 15, 2005

(65) Prior Publication Data

US 2007/0169586 A1  Jul. 26, 2007

(30) Foreign Application Priority Data

| Mar. 5, 2004 | (JP) | ............................... 2004-062251 |
| Mar. 12, 2004 | (JP) | ............................... 2004-070278 |
| Mar. 17, 2004 | (JP) | ............................... 2004-076757 |

(51) Int. Cl.
*B22F 3/00* (2006.01)
(52) U.S. Cl. ............................... 75/248; 75/232; 75/239
(58) Field of Classification Search ............... 75/248, 75/232, 239
See application file for complete search history.

(56) References Cited

U.S. PATENT DOCUMENTS

| 3,479,161 A | * | 11/1969 | Evans | ........................... 428/629 |
| 4,812,372 A | * | 3/1989 | Kithany | ...................... 428/664 |
| 5,774,780 A | * | 6/1998 | Prause | ........................... 419/12 |
| 6,090,227 A | * | 7/2000 | Leichtfried et al. | ......... 148/423 |

FOREIGN PATENT DOCUMENTS

| CA | 971398 A | 7/1975 |
| JP | 53-41087 B | 10/1978 |
| JP | 64-7141 B2 | 2/1989 |
| JP | 6-128604 A | 5/1994 |
| JP | 2001-220634 A | 8/2001 |
| JP | 2003239034 | 8/2003 |
| JP | 2004-83968 A | 3/2004 |
| JP | 2005240063 | 9/2005 |

OTHER PUBLICATIONS

International Search Report for PCT/JP2004/010278 mailed Aug. 31, 2004.

* cited by examiner

*Primary Examiner*—Roy King
*Assistant Examiner*—Ngoclan T Mai
(74) *Attorney, Agent, or Firm*—Darby & Darby P.C.

(57) ABSTRACT

A first tungsten-based sintered material of the present invention comprises Ni in a range from 0.2 to 1.5% by mass, $Y_2O_3$ in a range from 0.1 to 1% by mass, and optionally, (a) VC in a range from 0.05 to 0.5% by mass and/or (b) Co and/or Fe in a range from 0.01 to 5% by mass, the balance being tungsten (W); W phases are sinter-bonded; Ni phase or Ni—Co/Fe alloy phase which has the largest particle diameter of 5 μm or less and $Y_2O_3$ having the largest particle diameter of 5 μm or less are distributed at boundaries of the W phases; and the largest particle diameter of the W phase is 30 μm or less. The first tungsten-based sintered material is preferably used for a hot press mold for optical glass lenses.

8 Claims, No Drawings

TUNGSTEN-BASED SINTERED MATERIAL HAVING HIGH STRENGTH AND HIGH HARDNESS, AND HOT PRESS MOLD USED FOR OPTICAL GLASS LENSES

CROSS-REFERENCE TO PRIOR APPLICATION

This is a U.S. National Phase Application under 35 U.S.C. §371 of International Patent Application No. PCT/JP2004/010278 filed Jul. 13, 2004, and claims the benefit of Japanese Patent Applications No. 2004-62251, filed Mar. 5, 2004, 2004-70278 filed, Mar. 12, 2004 and 2004-76757, filed Mar. 17, 2004, all of which are incorporated by reference herein. The International Application was published in Japanese on Sep. 15, 2005 as WO 2005/085486 A1 under PCT Article 21(2).

TECHNICAL FIELD

The present invention relates to a tungsten-based sintered material having high strength and high hardness at high temperature, and a hot press mold comprising the same. Specifically, the present invention relates to a tungsten-based sintered material which has excellent durability against glass having extremely high causticity such as hexafluorosilicate glass or quartz glass, which needs to be molded at a high temperature, and high strength and hardness, as well as high thermal conductivity (exoergic properties), and which has a low thermal expansion coefficient. In addition, since the tungsten-based sintered material (abbreviated as "W-based sintered material" below) has such excellent properties, a mold made of the W-based sintered material is suitably used as a hot press mold for optical glass lenses which are elements of optical devices provided with many kinds of electronic devices, electric devices, or optical devices.

Priority is claimed on Japanese Patent Application No. 2004-062251 filed on Mar. 5, 2004, Japanese Patent Application No. 2004-070278 filed on Mar. 12, 2004, and Japanese Patent Application No. 2004-076757 filed on Mar. 17, 2004, the contents of which are incorporated herein by reference.

BACKGROUND ART

In general, a hot press mold used for optical glass lenses is required to have (a) high corrosion resistance to glass, (b) a high thermal conductivity (exoergic properties), and (c) a low thermal expansion coefficient. Therefore, W-based sintered materials having (a) a melting point in a range from 1,800 to 2,000° C., (b) a thermal conductivity in a range from 90 to 150 W/m·K, and (c) a thermal expansion coefficient in a range from $4.5 \times 10^{-6}$ to $5.5 \times 10^{-6}$/K are used as a material constituting a hot press mold used for optical glass lenses.

In addition, as is disclosed in Japanese Unexamined Patent Application, First Publication No. 2003-239034, a W-based sintered material used for a hot press mold is generally obtained by sintering a pressed powder comprising Ni in a range from 0.2 to 0.8% by mass (below, "%" denotes "% by mass"), the balance being W. It is also known that W phases are sinter-bonded in the W-based sintered material, that the W phase has the largest particle diameter of 40 µm or more by a texture observation using an electron scanning microscope, and that the W-based sintered material has a compressive strength in a range from 700 to 900 MPa, and Vickers hardness (Hv) in a range from 250 to 290.

In recent years, small-sizing and weight-saving of many kinds of electronic device, electric device, or optical devices have been remarkable, and optical glass lenses which are optical elements provided in these devices are also required to be small-sized and thin. In accordance with this, molding temperature and molding pressure of a hot press mold, which is an element of hot press molding device for optical glass lenses, tend to be high. However, since hot press molds made of conventional W-based sintered materials have insufficient strength and hardness, it is impossible to reply to these demands, and duration of life in the hot press molds is relatively short.

DISCLOSURE OF INVENTION

In order to produce a hot press mold made of a W-based sintered material which has improved strength and hardness without degrading the excellent properties of hot press molds made of conventional W-based sintered materials, and which provides excellent properties for a long time after hot press molding of small-sized and thin optical glass lenses is carried out, the present inventors have conducted diligent research on a W-based sintered material. As a result, the present inventors found that the following first and second W-based sintered materials provide excellent performances when they are used in hot press molding for optical glass lenses.

First, the first W-based sintered material is explained.

The first W-based sintered material of the present invention has the following composition.

Nickel (abbreviated as "Ni" below):0.2 to 1.5%

Yttrium oxide (abbreviated as "$Y_2O_3$" below):0.1 to 1%

If necessary, at least one of (a) and (b), and (a) Vanadium carbide (abbreviated as "VC" below):0.05 to 0.5%

(b) At least one of cobalt and iron (abbreviated as "Co/Fe" below):0.01 to 0.5%

W: remainder

The first W-based sintered material is, for example, produced by the following processes.

Nickel nitrate hydrate powder, nickel chloride hydrate powder, or nickel sulfate hydrate powder as a Ni source; cobalt nitrate hydrate powder, or the like as a Co source; and iron nitrate hydrate powder or the like as a Fe source are mixed so as to have the above-mentioned composition.

The resulting powder mixture is completely dissolved in a solvent such as acetone, and purified water, and then this is added to W powder having an average particle diameter in a range from 0.5 to 3 µm, for example, to obtain a slurry. The resulting slurry is kneaded in a kneader, and then dried to obtain raw W powder covered with a certain amount of nickel nitrate, nickel chloride, or nickel sulfate, or raw W powder further covered with cobalt nitrate and/or iron nitrate. Then the resulting raw covered W powder is subjected to a thermal treatment (for example, under conditions of a hydrogen atmosphere, at a temperature of 800° C., and a treatment time of 1 hour) to thermally decompose nickel nitrate, nickel chloride, nickel sulfate, cobalt nitrate, or iron nitrate which is on the surface of the particles of the W powder. Thereby, W powder covered with Ni, or W powder covered with Ni and Co/Fe is produced. After that, a certain amount of $Y_2O_3$ which is previously screened so as not to contain particles having a particle diameter of 5 µm or more is added to the obtained covered W powder. In some cases, it is possible to add a certain amount of VC powder together with the $Y_2O_3$ powder. In addition, it is also possible to add at least one of Co powder and Fe powder again in this process.

After these processes, the resulting powder is wet-mixed, dried, and press molded under ordinary treatment conditions to obtain a pressed powder.

A first W-based sintered material which is obtained by sintering the resulting pressed powder has a high melting point, high thermal conductivity, and low thermal expansion coefficient, which are compatible with the melting point, thermal conductivity, and thermal expansion coefficient of conventional W-based sintered materials. That is, the first W-based sintered material obtained by sintering the resulting pressed powder has:
(a) a melting point in a range from 1,800 to 2,000° C.,
(b) a thermal conductivity in a range from 90 to 150 W/m·K, and
(c) a thermal expansion coefficient in a range from $4.5 \times 10^{-6}$ to $5.5 \times 10^{-6}$/K.

Furthermore, according to a texture observation using an electron scanning microscope, the W-based sintered material comprises a fine texture in which W phases are sinter-bonded, and fine Ni phase or Ni—Co/Fe alloy phase and $Y_2O_3$ phase, which have the largest particle diameter of 5 μm or less ("particle diameter" means "particle diameter measured by a texture observation using an electron scanning microscope" below), are distributed at boundaries of the W phases, and the largest particle diameter of the W phases is 30 μm or less.

In conventional W-based sintered materials, the largest particle diameter of the W phases is 40 μm or more. In contrast, the largest particle diameter of the W phases in the first W-based sintered material according to the present invention is 30 μm or less, as is explained above. This difference is caused by the added $Y_2O_3$, that is, $Y_2O_3$ inhibits growth of the W phase.

In addition, it is also found that when VC is added to the W-based sintered material, and VC is coexistent with $Y_2O_3$, growth of the W phase is further inhibited, and the largest particle diameter of the W phase can be made to be 20 μm or less.

In addition, it is also found that the compressive strength is improved to a range from 1,350 to 2,000 MPa and the hardness (Hv) is improved to a range from 320 to 450 by adding Co/Fe. The compressive strength of conventional W-based sintered materials is in a range from 700 to 900 MPa, and Vickers hardness thereof is in a range from 250 to 290. Therefore, it is clear that the W-based sintered material of the present invention has both excellent strength and hardness.

Furthermore, a mold is produced using the first W-based sintered material of the present invention. Specifically, a hot press mold for producing small-sized and thin optical glass lenses which are made of hexafluorosilicate glass having extremely high causticity or quartz glass molded at a high temperature, and which are required to be molded at markedly high pressure and temperature to be small-sized and thin is produced using the first W-based sintered material of the present invention. The research results showing that the mold provides excellent performance for a long time are obtained. That is, the present inventors found that the first W-based sintered material of the present invention is preferably used for a hot press mold for producing optical glass lenses.

The present invention is obtained by these research results, and the first W-based sintered material having high strength and high hardness comprises:
Ni: 0.2 to 1.5%;
$Y_2O_3$: 0.1 to 1%;
if necessary, at least one of (a) and (b), wherein (a) VC: 0.05 to 0.5% and (b) Co/Fe: 0.01 to 0.5%, and
W: remainder,
W phases are sinter-bonded,
Ni phase or Ni—Co/Fe alloy phase and $Y_2O_3$ phase which have the largest particle diameter of 5 μm or less are distributed at boundaries of the W phase, and
the largest particle diameter of the W phase is 30 μm or less.

Then, the second W-based sintered material of the present invention is explained.

The second W-based sintered material has the following composition.
Ni: 0.2 to 1.5%;
$Y_2O_3$: 0.1 to 1%;
at least one of molybdenum (abbreviated as "Mo" below), chromium (abbreviated as "Cr" below), niobium (abbreviated as "Nb" below), and rhenium (abbreviated as "Re" below): 0.5 to 4%;
if necessary, at least one of (a) and (b); and
(a) VC: 0.05 to 0.5%
(b) Co/Fe: 0.01 to 0.5%
W: remainder.

The second W-based sintered material is, for example, produced by the following processes.

Similar to the first W-based sintered material, nickel nitrate powder, nickel chloride powder, or nickel sulfate powder in a hydrated state as a Ni source; cobalt nitrate powder or the like in a hydrated state as a Co source; and iron nitrate powder or the like in a hydrated state as a Fe source are mixed so as to have the above-mentioned composition.

The resulting powder mixture is completely dissolved in a solvent such as acetone, and purified water, and then this is added to W powder having an average particle diameter in a range from 0.5 to 3 μm, and at least one of Mo powder, Cr powder, Nb powder, and Re powder to obtain a slurry. Moreover, W-M alloy powder (wherein M denotes at least one of Mo, Cr, Nb, and Re) may be used as a part or all of the W powder. Below, powder consisting of W-M alloy powder and powder comprising W-M alloy powder are denoted by "W-M alloy powder".

Then, the resulting slurry is kneaded in a kneader, and then dried to obtain raw W-M alloy powder covered with a certain amount of nickel nitrate, nickel chloride, or nickel sulfate, or raw W-M alloy powder covered with a certain amount of nickel nitrate or the like and cobalt nitrate and/or iron nitrate. Then the resulting raw covered W-M alloy powder is subjected to a thermal treatment (for example, under conditions of a hydrogen atmosphere, at a temperature of 800° C., and a treatment time of 1 hour) to thermally decompose nickel nitrate, nickel chloride, or nickel sulfate, or in some cases, further cobalt nitrate and/or iron nitrate which is on the surface of the W-M alloy powder. Thereby, W-M alloy powder covered with Ni, or W-M alloy powder covered with Ni and Co/Fe is produced. After that, a certain amount of $Y_2O_3$ which is previously screened so as not to contain particles having a particle diameter of 5 μm or more is added to the obtained covered W-M alloy powder. At this time, it is possible to add a certain amount of VC powder together with $Y_2O_3$ powder. In addition, it is also possible to add at least one of Co powder and Fe powder again in this process.

After these processes, the resulting powder is wet-mixed, dried, and press molded under ordinary treatment conditions to obtain pressed powder.

A second W-based sintered material which is obtained by sintering the resulting pressed powder has a high melting point, high thermal conductivity, and low thermal expansion coefficient, which are compatible with the melting point, thermal conductivity, and thermal expansion coefficient of conventional W-based sintered materials. That is, the second W-based sintered material obtained by sintering the resulting pressed powder has:
(a) a melting point in a range from 1,800 to 2,000° C.,
(b) a thermal conductivity in a range from 70 to 130 W/m·K, and (c) a thermal expansion coefficient in a range from $4.8 \times 10^{-6}$ to $6.2 \times 10^{-6}$/K.

During sintering, W-M alloy phase (wherein, M denotes at least one of Mo, Cr, Nb, and Re) is formed by dissolving at least one of Mo, Cr, Nb, and Re in W. Moreover, when W-M alloy powder is used, the W-M alloy is present as a W-M alloy phase. The W-M alloy phase is harder than the W phase, and W-M alloy phases are sinter-bonded. In addition, it was confirmed that a fine Ni phase or Ni—Co/Fe alloy phase and $Y_2O_3$ phase which have the largest particle diameter of 5 μm or less are distributed at boundaries of the W-M alloy phases. It was also confirmed that the second W-based sintered material has a fine particle texture in which the largest particle diameter of the W-M alloy phases is 30 μm or less.

In conventional W-based sintered materials, the largest particle diameter of the W phases is 40 μm or more. In contrast, the largest particle diameter of the W-M alloy phases in the second W-based sintered material according to the present invention is 30 μm or less, as is explained above. This difference is caused by added $Y_2O_3$, that is, $Y_2O_3$ inhibits growth of the W-M alloy phase.

In addition, it is also found that when VC is added to the W-M alloy powder, and VC is coexistent with $Y_2O_3$, growth of the W-M alloy phase is further inhibited, and the largest particle diameter of the W-M alloy phase can be made to be 15 μm or less.

In addition, it is also found that the compressive strength is improved to a range from 1,400 to 2,200 MPa and the hardness (Hv) is improved to a range from 350 to 550 by adding Co/Fe. The compressive strength of conventional W-based sintered materials is in a range from 700 to 900 MPa, and Vickers hardness thereof is in a range from 250 to 290. Therefore, it is clear that the second W-based sintered material of the present invention has both excellent strength and hardness.

Furthermore, a mold is produced using the second W-based sintered material of the present invention. Specifically, a hot press mold for producing small-sized and thin optical glass lenses which are made of hexafluorosilicate glass having extremely high causticity or quartz glass molded at a high temperature, and which are required to be molded at markedly high pressure and temperature to be small-sized and thin is produced using the second W-based sintered material of the present invention. The research results showing that the mold provides excellent performance for a long time are obtained. That is, the present inventors found that the second W-based sintered material is preferably used for a hot press mold for producing optical glass lenses.

The present invention is obtained by these research results, and the second W-based sintered material having high strength and high hardness comprises:

Ni: 0.2 to 1.5%;

$Y_2O_3$: 0.1 to 1%;

at least one of Mo, Cr, Nb, and Re: 0.5 to 4%;

if necessary, at least one of (a) and (b), wherein (a) VC: 0.05 to 0.5% and (b) Co/Fe: 0.01 to 0.5%; and W: remainder;

W-M alloy phases (wherein, M denotes at least one of Mo, Cr, Nb, and Re) are sinter-bonded;

Ni phase or Ni—Co/Fe alloy phase and $Y_2O_3$ phase which have the largest particle diameter of 5 μm or less are distributed at boundaries of the W-M alloy phases; and the largest particle diameter of the W-M alloy phase is 30 μm or less.

MODES FOR CARRYING OUT THE INVENTION

Below, the reasons for limiting the composition of the first and second W-based sintered materials will be explained.

Ni: 0.2 to 1.5%

When Ni is present in pressed powder so as to cover the surface of the W powder or the W-M alloy powder, sintering degree is remarkably improved. In addition, strength of the W-based sintering material is improved by being present as the Ni phase or the Ni—Co/Fe alloy phase which have the largest particle diameter of 5 μm or less at the boundaries of the W phases or the W-M alloy phases. However, when the ratio of added Ni is less than 0.2%, improvement of sintering degree is insufficient, and the Ni phase or the Ni—Co/Fe alloy phase is insufficiently distributed, and desired high strength of the W-based sintered material cannot be obtained. In contrast, when the ratio added exceeds 1.5%, not only does hardness tend to decrease but also the Ni phase or the Ni—Co/Fe alloy phase which has the largest particle diameter of more than 5 μm tends to be distributed. This may be one of the reasons for the accelerated abrasion of the surface of a cavity in a mold. Therefore, the ratio of added Ni is limited to a range from 0.2 to 1.5%, and preferably in a range from 0.7 to 1.2%.

As is explained above, it is possible to easily make the largest particle diameter of the Ni phase or the Ni—Co/Fe alloy phase which is distributed at boundaries of the W phase or the W-M alloy phase 5 μm or less by the presence of nickel nitrate, cobalt nitrate, or iron nitrate as Ni or Ni and Co/Fe on the surface of the W powder or the W-M alloy powder during the mixing of raw powders. It is possible to add Ni powder, Co powder or Fe powder together with $Y_2O_3$ powder or $Y_2O_3$ powder and VC powder. However, it is necessary to adjust the particle size of the Ni powder, Co powder or Fe powder.

When the largest particle diameter of the Ni phase or the Ni—Co/Fe alloy phase exceeds 5 μm, surface roughness of a cavity in a mold suddenly decreases and the largest particle diameter of the Ni phase or the Ni—Co/Fe alloy phase is 5 μm or less.

$Y_2O_3$: 0.1 to 1%

$Y_2O_3$ inhibits excess growth of the W phase or the W-M alloy phase during sintering. That is, the largest particle diameter of the W phase or the W-M alloy phase is made to be 30 μm or less by distributing $Y_2O_3$ having the largest particle diameter of 5 μm or less at boundaries of the W phase or the W-M alloy phase after sintering. Thereby, hardness and strength of the W-based sintered material are improved.

When the ratio of added $Y_2O_3$ is less than 1%, the effect is not sufficiently obtained. In contrast, when the ratio thereof exceeds 1%, $Y_2O_3$ phases at boundaries of the W phase or the W-M alloy phase are easily coagulated, and the coagulation decreases strength. Therefore, the ratio of added $Y_2O_3$ is limited to a range from 0.1 to 1%, and preferably from 0.2 to 0.7%.

It is necessary to adjust the largest particle diameter of $Y_2O_3$ phase distributed at boundaries of the W phase or the W-M alloy phase to 5 μm or less by adjusting the particle diameter of the added $Y_2O_3$ powder. If $Y_2O_3$ having a particle diameter of more than 5 μm is added, strength tends to remarkably decrease.

VC: 0.05 to 0.5%

When VC is coexistent with $Y_2O_3$, VC is dissolved in Ni or Ni—Co/Fe alloy during sintering, inhibits excess growth of the W phase or the W-M alloy phase, and makes the largest particle diameter of the W phase 20 μm or less and the largest particle diameter of the W-M alloy phase 15 μm. Therefore, VC is added, if necessary.

When the ratio is less than 0.05%, the effect is not sufficiently obtained. In contrast, when the ratio exceeds 0.5%, VC is distributed at the boundaries of the W phase or the W-M alloy phase, and this is one reason for the decrease of strength. Therefore, the ratio of added VC is limited to a range from 0.05 to 0.5%, and preferably from 0.1 to 0.3%.

At Least One of Co and Fe (Co/Fe): 0.01 to 0.5%

Co/Fe forms an alloy together with Ni, and improves strength of the boundaries of the W phase or the W-M alloy phase, and improves strength of the W-based sintered material. Therefore, Co/Fe is added, if necessary.

When the ratio is less than 0.01%, the effect is not sufficiently obtained. In contrast, when the ratio exceeds 0.5%, hardness tends to decrease, and becomes one reason for acceleration of abrasion of the cavity surface in a mold. Therefore, the ratio of added Co/Fe is limited to a range from 0.01 to 0.5%, and preferably from 0.05 to 0.3%.

At Least One of Mo, Cr, Nb, and Re: 0.5 to 4%

These elements dissolve in W, and exist as the W-M alloy phase, which is harder than W in the sintering material. These elements improve hardness. Therefore, these elements improve abrasion resistance in the W-based sintered material.

When the ratio is less than 0.5%, hardness is not sufficiently improved. In contrast, when the ratio exceeds 4%, these elements are deposited at the boundaries of the W-M alloy phase as released M phase, and this becomes one reason for the decrease of strength. Therefore, the addition ratio of at least one of these elements is limited to a range from 0.5 to 4%, and preferably from 1 to 3%.

Below, the W-based sintered materials and the molds of the present invention will be explained with reference to Examples and Comparative Examples.

EXAMPLES 1 to 32 AND COMPARATIVE EXAMPLES 1

Nickel nitrate hydrate ($Ni(NO_3)_2 \cdot 6H_2O$) powder having a purity degree of 99.6%, cobalt nitrate hydrate powder having a purity degree of 99.6%, and iron nitrate hydrate powder having a purity degree of 99.6 were prepared.

These Ni powder, Co powder, and Fe powder were dissolved in acetone so as to have a composition shown in Tables 1 and 2. Then, a slurry was obtained by adding W powder having an average particle diameter of 2.5 μm. The resulting slurry was kneaded and dried to obtain raw W powder covered with a certain amount of nickel nitrate, cobalt nitrate and/or iron nitrate.

After that, the raw covered W powder was thermally treated (hydrogen atmosphere, a temperature of 800° C., and a treatment time of 1 hour) to thermally decompose nickel nitrate, cobalt nitrate, or iron nitrate on the surface of the W powder. Thereby, raw W powder covered with Ni or raw W powder covered with Ni—Co/Fe alloy was obtained.

$Y_2O_3$ powder and VC powder which have an average particle diameter of 1 μm were added to the obtained raw covered W powder so as to obtain a composition as shown in Tables 1 and 2.

After these processes, the resulting powder was wet-mixed in a ball mill using acetone as a solvent for 48 hours, and then it was dried. After drying, the powder was filled in a rubber die and pressed by isostatic pressing at 150 MPa to obtain a solid having a size of diameter: 50 mm×height: 40 mm. Then, the solid was subjected to a pre-sintering (hydrogen atmosphere, a temperature of 900° C., and a treatment time of 5 hours) and a sintering (hydrogen atmosphere, a temperature of 1,470° C., and a treatment time of 2 hours) to obtain a raw solid for a mold made of the W-based sintered material of the present invention or the comparative W-based sintered material.

The two obtained raw solids were used as a pair of upper and lower cores. A curved cavity having a diameter of 38 mm×center depth of 5 mm was formed at the top surface of the lower core. A curved cavity was not formed in the upper core. Both of the bottom surface of the upper core and the curved surface of the lower core were polished such that roughness (Rmax) was less than 0.05 μm to produce hot press molds 1 to 32 for optical glass lenses made of the W-based sintered material of the present invention (abbreviated as "molds 1 to 32 of the present invention" below), and a comparative hot press mold for optical glass lenses made of a conventional W-based sintered material (abbreviated as "comparative mold 1" below).

It was confirmed that both the W-based sintered materials constituting the molds 1 to 32 of the present invention and the comparative mold 1 had a high melting point such as 1,800 to 2,000° C., and high thermal conductivity such as 90 to 150 W/m·K, and a low thermal expansion coefficient such as $4.5 \times 10^{-6}$ to $5.5 \times 10^{-6}$/K.

In addition, compressive strength and Vickers hardness were measured. The results are shown in Tables 1 and 2.

Furthermore, the largest particle diameter of the Ni phase or Ni—Co/Fe alloy phase, and $Y_2O_3$ phase distributed at the boundaries of the W phase or on the W phase was measured using an electron scanning microscope, and the results obtained by the measurement are also shown in Tables 1 and 2.

It was also confirmed that the W phases were sinter-bonded in the W-based sintered material constituting the molds 1 to 32 of the present invention, and that fine Ni phase or Ni—Co/Fe alloy phase and $Y_2O_3$ phase were uniformly distributed at the boundaries of the W phase.

Then, thin and small-sized optical glass lenses having a size of the diameter: 5 mm×the largest thickness: 2 mm were formed by press molding a gob (press molding conditions: the material of a gob (material of a glass lens): quartz glass; a volume of the gob: $0.2 \text{ cm}^3$; a heating temperature of the gob: 1,200 ° C.; a press molding pressure: 10 MPa; and the press molding speed: 6 optical glass lenses/hours) using the obtained mold, and then the number of formed optical glass lenses until the roughness (Rmax) of the curved surface of the core became 0.06 μm was counted. The results are also shown in Tables 1 and 2.

TABLE 1

| | | Addition ratio (% by mass) | | | | | The largest particle diameter of W phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|
| | | Ni | Y$_2$O$_3$ | VC | Co | Fe | W | | | | | |
| Mold of the Present invention | 1 | 0.2 | 0.5 | — | — | — | remainder | 8.7 | 1.2 | 1.6 | 1351 | 378 | 493 |
| | 2 | 0.5 | 0.5 | — | — | — | remainder | 8.3 | 1.2 | 1.6 | 1358 | 371 | 504 |
| | 3 | 0.9 | 0.5 | — | — | — | remainder | 12.1 | 1.9 | 2.8 | 1565 | 352 | 551 |
| | 4 | 1.1 | 0.5 | — | — | — | remainder | 9.8 | 1.9 | 2.1 | 1748 | 362 | 633 |
| | 5 | 1.3 | 0.5 | — | — | — | remainder | 15.2 | 2.7 | 3.1 | 1792 | 342 | 613 |
| | 6 | 1.5 | 0.5 | — | — | — | remainder | 17.5 | 3.3 | 2.6 | 1898 | 337 | 639 |
| | 7 | 0.9 | 0.1 | — | — | — | remainder | 27.5 | 4.8 | 0.7 | 1368 | 321 | 439 |
| | 8 | 0.9 | 0.3 | — | — | — | remainder | 14.9 | 2.1 | 1.8 | 1518 | 343 | 521 |
| | 9 | 0.9 | 0.7 | — | — | — | remainder | 7.6 | 1.5 | 3.4 | 1651 | 376 | 621 |
| | 10 | 0.9 | 1 | — | — | — | remainder | 6.3 | 1.4 | 4.6 | 1673 | 388 | 649 |
| | 11 | 0.9 | 0.5 | 0.05 | — | — | remainder | 7.7 | 1.5 | 2.6 | 1649 | 375 | 618 |
| | 12 | 0.9 | 0.5 | 0.1 | — | — | remainder | 5.0 | 1.3 | 1.8 | 1680 | 403 | 677 |
| | 13 | 0.9 | 0.5 | 0.2 | — | — | remainder | 3.8 | 1.2 | 2.0 | 1651 | 424 | 700 |
| | 14 | 0.9 | 0.5 | 0.3 | — | — | remainder | 3.2 | 1.2 | 3.1 | 1608 | 438 | 704 |
| | 15 | 0.9 | 0.5 | 0.4 | — | — | remainder | 2.9 | 1.1 | 2.2 | 1560 | 449 | 700 |
| | 16 | 0.9 | 0.5 | 0.5 | — | — | remainder | 2.8 | 1.1 | 1.5 | 1545 | 452 | 698 |

In Table 1, "Ni phase" means "Ni phase or Ni-Co/Fe alloy phase".

TABLE 2

| | | Addition ratio (% by mass) | | | | | | The largest particle diameter of W phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|---|
| | | Ni | Y$_2$O$_3$ | VC | Co | Fe | W | | | | | | |
| Mold of the Present invention | 17 | 0.9 | 0.5 | — | 0.01 | — | remainder | 12.1 | 1.9 | 2.8 | 1572 | 352 | 553 |
| | 18 | 0.9 | 0.5 | — | 0.1 | — | remainder | 12.8 | 2.1 | 3.1 | 1622 | 350 | 567 |
| | 19 | 0.9 | 0.5 | — | 0.3 | — | remainder | 13.5 | 2.4 | 3.3 | 1750 | 347 | 607 |
| | 20 | 0.9 | 0.5 | — | 0.5 | — | remainder | 14.1 | 2.7 | 3.5 | 1880 | 345 | 649 |
| | 21 | 0.9 | 0.5 | — | — | 0.01 | remainder | 12.1 | 1.9 | 2.8 | 1572 | 352 | 553 |
| | 22 | 0.9 | 0.5 | — | — | 0.2 | remainder | 12.6 | 2.2 | 3.0 | 1695 | 350 | 593 |
| | 23 | 0.9 | 0.5 | — | — | 0.4 | remainder | 13.3 | 2.5 | 3.2 | 1823 | 348 | 634 |
| | 24 | 0.9 | 0.5 | — | — | 0.5 | remainder | 13.5 | 2.7 | 3.3 | 1890 | 347 | 656 |
| | 25 | 0.9 | 0.5 | — | 0.05 | 0.01 | remainder | 12.4 | 2.0 | 2.9 | 1600 | 351 | 561 |
| | 26 | 0.9 | 0.5 | — | 0.1 | 0.1 | remainder | 12.8 | 2.2 | 3.1 | 1692 | 350 | 592 |
| | 27 | 0.9 | 0.5 | — | 0.2 | 0.3 | remainder | 13.5 | 2.7 | 3.3 | 1890 | 347 | 656 |
| | 28 | 0.9 | 0.5 | 0.05 | 0.2 | — | remainder | 8.3 | 1.7 | 1.6 | 1778 | 371 | 660 |
| | 29 | 0.9 | 0.5 | 0.2 | 0.1 | 0.2 | remainder | 4.3 | 1.4 | 1.8 | 1879 | 415 | 780 |
| | 30 | 0.9 | 0.5 | 0.3 | 0.5 | — | remainder | 3.9 | 1.4 | 1.2 | 1995 | 422 | 846 |
| | 31 | 0.9 | 0.5 | 0.4 | — | 0.01 | remainder | 3.4 | 1.2 | 2.1 | 1629 | 434 | 707 |
| | 32 | 0.9 | 0.5 | 0.5 | — | 0.3 | remainder | 3.1 | 1.2 | 2.5 | 1806 | 441 | 796 |
| Comp. mold 1 | | 0.5 | — | — | — | — | reminder | 54.0 | — | — | 891 | 253 | 270 |

In Table 2, "Ni phase" means "Ni phase or Ni-Co/Fe alloy phase".

As is shown in Tables 1 and 2, it was confirmed that since the Ni phase or the Ni—Co/Fe alloy phase was distributed, the molds 1 to 32 of the present invention having a fine texture in which the largest particle diameter of the W phase was 30 μm or less have excellent glass corrosion resistance, and high melting point, high thermal conductivity (exoergic property), and a low thermal expansion coefficient, and higher strength and higher hardness compared with the comparative mold 1 made of the W-based sintered material in which a Ni phase or a Ni—Co/Fe alloy phase and a Y$_2$O$_3$ phase did not exist at the boundaries of the W phase, and which had a texture comprising large particles having the largest particle diameter of more than 40 μm.

In addition, it is clear that when the hot press mold made of the W-based sintered material of the present invention is used for hot press molding optical glass lenses made of silicate glass or borate glass which has relatively weak causticity, the mold absolutely maintains excellent surface of the cavity for a long time. It is also clear that even when the mold of the present invention is used for hot press molding hexafluorosilicate glass having remarkably high causticity or quartz glass needing a high molding temperature such as 1,100° C. to produce thin and small-sized optical glass lenses, the mold also absolutely maintains excellent surface of the cavity for a long time, and has a long life time.

EXAMPLES 33 TO 92 AND COMPARATIVE EXAMPLE 2.

W powder, Mo powder, Cr powder, Nb powder, and Re powder which have an average particle diameter of 2.5 μm were prepared as raw powder contributing W-M alloy powder. Then, nickel nitrate hydrate (Ni(NO3)$_2$.6H$_2$O) powder having a purity degree of 99.6%, cobalt nitrate hydrate powder having a purity degree of 99.6%, and iron nitrate hydrate powder having a purity degree of 99.6 were also prepared.

A certain amount of the hydrate powders were dissolved in acetone, and then the obtained mixture was added to the W-M alloy powder to obtain a slurry. In Comparative Example 2, only a certain amount of nickel nitrate hydrate powder and the W powders were dissolved in acetone to obtain a slurry.

The resulting slurry was kneaded and dried to obtain raw W-M alloy powder covered with a certain amount of nickel nitrate, raw W-M alloy powder covered with a certain amount of nickel nitrate, and at least one of cobalt nitrate and iron nitrate, and comparative raw W powder covered with a certain amount of nickel nitrate.

After that, the raw covered W-M alloy powders and the comparative raw covered W powder were thermally treated (hydrogen atmosphere, a temperature of 800° C., and a treatment time of 1 hour) to thermally decompose nickel nitrate, and cobalt nitrate and/or iron nitrate on the surface of the W-M powder. Thereby, raw W-M alloy powder covered with Ni, raw W-M alloy powder covered with Ni—Co/Fe alloy, and comparative raw W powder covered with Ni were obtained.

Y$_2$O$_3$ powder and VC powder which had already been classified so as to have an average particle diameter of 1 μm, and not to contain particles having a diameter of 5 μm or more, Co powder and Fe powder having an average particle diameter of 3 μm were added to only the obtained raw covered W-M alloy powder so as to have a composition as shown in Tables 3 to 6.

After these processes, the resulting powder was wet-mixed in a ball mill using acetone as a solvent for 48 hours, and then it was dried. After drying, the powder was filled in a rubber die and pressed by isostatic pressing at 150 MPa to obtain a solid having a size of diameter: 50 mm×height: 40 mm. Then, the solid was subjected to a pre-sintering (hydrogen atmosphere, a temperature of 900° C., and a treatment time of 5 hours) and a sintering (hydrogen atmosphere, a temperature of 1,450° C., and a treatment time of 1 hour) to obtain a raw solid for a mold made of the W-based sintered material of the present invention or the comparative W-based sintered material.

The two obtained raw solids for a mold were used as a pair of upper and lower cores. A curved cavity having a diameter of 38 mm×center depth of 5 mm was formed at the top surface of the lower core. A curved cavity was not formed in the upper core. Both of the bottom surface of the upper core and the curved surface of the lower core were polished such that roughness (Rmax) was less than 0.05 μm to produce hot press molds 33 to 92 for optical glass lenses made of the W-based sintered material of the present invention (abbreviated as "molds 33 to 92 of the present invention" below), and a hot press mold for optical glass lenses made of a conventional W-based sintered material (abbreviated as "comparative mold 2" below).

It was confirmed that both the W-based sintered materials constituting the molds 33 to 92 of the present invention and the comparative mold 1 had a high melting point such as 1,800 to 2,000° C., and a high thermal conductivity such as 70 to 130 W/m·K, and a low thermal expansion coefficient such as $4.8 \times 10^{-6}$ to $6.2 \times 10^{-6}$/K.

In addition, compressive strength and Vickers hardness were measured. The results are shown in Tables 3 to 6.

Furthermore, the largest particle diameter of the Ni phase or the Ni—Co/Fe alloy phase, and the Y$_2$O$_3$ phase distributed at the boundaries of the W-M alloy phase or on the W-M alloy phase was measured using an electron scanning microscope, and the results obtained by the measurement are also shown in Tables 3 to 6.

It was also confirmed that the W-M alloy phases were sinter-bonded in the W-M alloy-based sintered material constituting the molds 33 to 92 of the present invention, and that fine Ni phase or Ni—Co/Fe alloy phase and the Y$_2$O$_3$ phase were uniformly distributed at the boundaries of the W-M alloy phase.

Then, thin and small-sized optical glass lenses having a size of the diameter: 5 mm×the largest thickness: 2 mm were formed by press molding a gob (press molding conditions: the material of a gob (material of a glass lens): quartz glass; a volume of the gob: 0.2 cm$^3$; a heating temperature of the gob: 1,200 ° C.; a press molding pressure: 10 MPa; and the press molding speed: 6 optical glass lenses/hours) using the obtained mold, and then the number of formed optical glass lenses until the roughness (Rmax) of the curved surface of the core became 0.06 μm was counted. The results are also shown in Tables 3 to 6.

TABLE 3

| | | Addition ratio (% by mass) | | | | | | | | | The largest particle diameter of W-M alloy phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|---|---|---|---|
| | | Mo | Cr | Nb | Re | Ni | Y$_2$O$_3$ | VC | Co | Fe | W | | | | | | |
| Mold of the Present invention | 33 | 4 | — | — | — | 0.2 | 0.5 | — | — | — | Remainder | 12.3 | 1.4 | 3.4 | 1590 | 457 | 594 |
| | 34 | — | 2 | — | — | 0.5 | 0.5 | — | — | — | Remainder | 15.3 | 2.1 | 3.7 | 1459 | 424 | 542 |
| | 35 | — | — | 1 | — | 0.9 | 0.5 | — | — | — | Remainder | 19.4 | 3.2 | 4.0 | 1410 | 408 | 568 |
| | 36 | — | — | — | 0.5 | 1.1 | 0.5 | — | — | — | Remainder | 21.5 | 3.7 | 4.2 | 1394 | 401 | 535 |
| | 37 | 0.5 | 1 | — | — | 1.3 | 0.5 | — | — | — | Remainder | 23.5 | 4.3 | 4.4 | 1461 | 410 | 587 |
| | 38 | 3 | — | 1 | — | 1.5 | 0.5 | — | — | — | Remainder | 25.6 | 5.0 | 4.6 | 1594 | 430 | 597 |
| | 39 | 4 | — | — | 1 | 0.7 | 0.1 | — | — | — | Remainder | 26.5 | 3.6 | 3.3 | 1549 | 438 | 605 |
| | 40 | — | 1 | 0.5 | — | 0.7 | 0.3 | — | — | — | Remainder | 21.0 | 3.0 | 3.6 | 1404 | 410 | 596 |
| | 41 | — | 3 | — | 0.5 | 0.7 | 0.7 | — | — | — | Remainder | 14.8 | 2.4 | 4.2 | 1529 | 433 | 594 |
| | 42 | — | — | 0.5 | 3 | 0.7 | 1.0 | — | — | — | Remainder | 12.2 | 2.1 | 4.7 | 1507 | 429 | 591 |
| | 43 | 2 | 1 | 0.5 | — | 0.5 | 0.5 | — | — | — | Remainder | 15.3 | 2.1 | 3.7 | 1538 | 439 | 610 |
| | 44 | 2 | — | 1 | 0.5 | 0.7 | 0.5 | — | — | — | Remainder | 17.4 | 2.6 | 3.9 | 1524 | 432 | 607 |
| | 45 | 2 | 1 | — | 0.5 | 0.9 | 0.5 | — | — | — | Remainder | 19.4 | 3.2 | 4.0 | 1538 | 431 | 605 |

TABLE 3-continued

| | | Addition ratio (% by mass) | | | | | | | | | The largest particle diameter of W-M alloy phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|---|---|---|---|
| | | Mo | Cr | Nb | Re | Ni | Y$_2$O$_3$ | VC | Co | Fe | W | | | | | | |
| | 46 | — | 1 | 0.5 | 1 | 1.1 | 0.5 | — | — | — | Remainder | 21.5 | 3.7 | 4.2 | 1457 | 412 | 597 |
| | 47 | 1 | 0.5 | 0.5 | 0.5 | 1.3 | 0.5 | — | — | — | Remainder | 23.5 | 4.3 | 4.4 | 1492 | 415 | 590 |

TABLE 4

| | | Addition ratio (% by mass) | | | | | | | | | The largest particle diameter of W-M alloy phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|---|---|---|---|
| | | Mo | Cr | Nb | Re | Ni | Y$_2$O$_3$ | VC | Co | Fe | W | | | | | | |
| Mold of the Present invention | 48 | 0.5 | — | — | — | 0.7 | 0.5 | 0.2 | — | — | Remainder | 4.1 | 1.2 | 2.7 | 1706 | 474 | 728 |
| | 49 | — | 4 | — | — | 0.7 | 0.5 | 0.1 | — | — | Remainder | 6.7 | 1.5 | 2.9 | 1701 | 471 | 731 |
| | 50 | — | — | 2 | — | 0.7 | 0.5 | 0.2 | — | — | Remainder | 4.1 | 1.2 | 2.7 | 1725 | 479 | 725 |
| | 51 | — | — | — | 1 | 1.5 | 0.5 | 0.3 | — | — | Remainder | 4.4 | 2.0 | 2.7 | 1764 | 468 | 694 |
| | 52 | 3 | 1 | — | — | 0.7 | 1.0 | 0.3 | — | — | Remainder | 2.1 | 1.0 | 3.5 | 1915 | 556 | 746 |
| | 53 | 3 | — | 1 | — | 0.7 | 0.2 | 0.05 | — | — | Remainder | 13.0 | 2.2 | 2.7 | 1710 | 450 | 741 |
| | 54 | 3 | — | — | 1 | 0.7 | 0.5 | 0.1 | — | — | Remainder | 6.7 | 1.5 | 2.9 | 1713 | 476 | 750 |
| | 55 | — | 1 | 0.5 | — | 0.7 | 0.5 | 0.2 | — | — | Remainder | 4.1 | 1.2 | 2.7 | 1723 | 478 | 706 |
| | 56 | — | 3 | — | 0.5 | 0.7 | 0.5 | 0.3 | — | — | Remainder | 3.0 | 1.1 | 2.6 | 1831 | 513 | 685 |
| | 57 | — | — | 0.5 | 3 | 0.7 | 0.5 | 0.5 | — | — | Remainder | 1.9 | 1.0 | 2.5 | 1886 | 537 | 739 |
| | 58 | 2 | 1 | 0.5 | — | 0.2 | 0.5 | 0.05 | — | — | Remainder | 6.8 | 1.0 | 2.9 | 1646 | 471 | 725 |
| | 59 | 2 | — | 1 | 0.5 | 0.5 | 0.1 | 0.1 | — | — | Remainder | 9.0 | 1.5 | 2.2 | 1614 | 456 | 736 |
| | 60 | 2 | 1 | — | 0.5 | 0.7 | 0.5 | 0.2 | — | — | Remainder | 4.1 | 1.2 | 2.7 | 1787 | 497 | 742 |
| | 61 | — | 1 | 0.5 | 1 | 0.7 | 0.5 | 0.3 | — | — | Remainder | 3.0 | 1.1 | 2.6 | 1804 | 503 | 716 |
| | 62 | 1 | 0.5 | 0.5 | 0.5 | 0.7 | 0.5 | 0.5 | — | — | Remainder | 1.9 | 1.0 | 2.5 | 1897 | 543 | 743 |

TABLE 5

| | | Addition ratio (% by mass) | | | | | | | | | The largest particle diameter of W-M alloy phase (μm) | The largest particle diameter of Ni phase (μm) | The largest particle diameter of Y$_2$O$_3$ phase (μm) | Compressive strength (MPa) | Hv | Number of formed lenses |
|---|---|---|---|---|---|---|---|---|---|---|---|---|---|---|---|---|
| | | Mo | Cr | Nb | Re | Ni | Y$_2$O$_3$ | VC | Co | Fe | W | | | | | | |
| Mold of the Present invention | 63 | 1 | — | — | — | 0.7 | 0.5 | — | — | 0.4 | Remainder | 21.5 | 3.7 | 4.2 | 1803 | 410 | 686 |
| | 64 | — | 0.5 | — | — | 1.5 | 0.5 | — | 0.01 | — | Remainder | 25.7 | 5.0 | 4.6 | 1655 | 350 | 635 |
| | 65 | — | — | 4 | — | 0.7 | 0.5 | — | 0.1 | 0.1 | Remainder | 19.4 | 3.2 | 4.0 | 1644 | 423 | 689 |
| | 66 | — | — | — | 2 | 0.5 | 0.5 | — | 0.1 | — | Remainder | 16.4 | 2.4 | 3.8 | 1725 | 414 | 696 |
| | 67 | 0.5 | 1 | — | — | 0.7 | 0.5 | — | — | 0.2 | Remainder | 19.4 | 3.2 | 4.0 | 1650 | 415 | 681 |
| | 68 | 3 | — | 1 | — | 0.7 | 0.5 | — | 0.2 | 0.1 | Remainder | 20.5 | 3.5 | 4.1 | 1783 | 425 | 697 |
| | 69 | 3 | — | — | 1 | 0.7 | 0.5 | — | 0.3 | — | Remainder | 20.5 | 3.5 | 4.1 | 1743 | 416 | 623 |
| | 70 | — | 1 | 0.5 | — | 1.0 | 0.5 | — | — | 0.3 | Remainder | 23.5 | 4.3 | 4.4 | 1717 | 407 | 664 |
| | 71 | — | 3 | — | 0.5 | 0.7 | 0.5 | — | 0.1 | 0.3 | Remainder | 21.5 | 3.7 | 4.2 | 1842 | 422 | 692 |
| | 72 | — | — | 0.5 | 3 | 0.7 | 0.5 | — | 0.4 | — | Remainder | 21.5 | 3.7 | 4.2 | 1692 | 411 | 641 |
| | 73 | 2 | 1 | 0.5 | — | 0.7 | 1.0 | — | — | 0.4 | Remainder | 15.0 | 2.9 | 5.0 | 1861 | 436 | 695 |
| | 74 | 2 | — | 1 | 0.5 | 0.7 | 0.5 | — | 0.3 | 0.2 | Remainder | 22.5 | 4.0 | 4.3 | 1897 | 425 | 697 |
| | 75 | 2 | 1 | — | 0.5 | 0.7 | 0.5 | — | 0.5 | — | Remainder | 17.4 | 2.6 | 3.9 | 1834 | 434 | 675 |
| | 76 | — | 1 | 0.5 | 1 | 0.7 | 0.5 | — | — | 0.5 | Remainder | 22.5 | 4.0 | 4.3 | 1840 | 411 | 683 |
| | 77 | 1 | 0.5 | 0.5 | 0.5 | 0.2 | 0.1 | — | 0.2 | 0.3 | Remainder | 26.5 | 3.6 | 3.3 | 1805 | 412 | 692 |

TABLE 6

| | | Addition ratio (% by mass) | | | | | | | | | The largest particle diameter of W-M alloy phase (μm) | The largest particle diameter of Ni phase (μm) | The largest particle diameter of Y₂O₃ phase (μm) | Compressive strength (MPa) | Hv | Number of formed lenses |
|---|---|---|---|---|---|---|---|---|---|---|---|---|---|---|---|---|
| | | Mo | Cr | Nb | Re | Ni | Y₂O₃ | VC | Co | Fe | W | | | | | | |
| Mold of the Present invention | 78 | 0.5 | — | — | — | 0.7 | 0.2 | 0.05 | 0.01 | — | Remainder | 13.1 | 2.2 | 2.7 | 2006 | 420 | 925 |
| | 79 | — | 1 | — | — | 0.7 | 0.5 | 0.1 | — | 0.01 | Remainder | 6.7 | 1.5 | 2.9 | 2015 | 449 | 809 |
| | 80 | — | — | 0.5 | — | 0.7 | 0.5 | 0.2 | 0.1 | 0.1 | Remainder | 4.6 | 1.5 | 2.7 | 2040 | 465 | 917 |
| | 81 | — | — | — | 4 | 1.5 | 0.5 | 0.3 | 0.1 | — | Remainder | 4.6 | 2.1 | 2.7 | 2060 | 475 | 845 |
| | 82 | 1 | 1 | — | — | 0.7 | 0.5 | 0.5 | — | 0.2 | Remainder | 2.2 | 1.2 | 2.5 | 2278 | 533 | 923 |
| | 83 | 3 | — | 1 | — | 0.7 | 0.5 | 0.05 | 0.2 | 0.1 | Remainder | 11.4 | 2.4 | 3.3 | 2070 | 455 | 992 |
| | 84 | 3 | — | — | 1 | 0.7 | 0.5 | 0.1 | 0.3 | — | Remainder | 7.9 | 1.9 | 3.0 | 2094 | 468 | 896 |
| | 85 | — | 1 | 0.5 | — | 0.7 | 0.5 | 0.2 | — | 0.3 | Remainder | 4.9 | 1.6 | 2.7 | 2187 | 469 | 944 |
| | 86 | — | 3 | — | 0.5 | 0.7 | 0.5 | 0.3 | 0.1 | 0.3 | Remainder | 3.7 | 1.5 | 2.6 | 2210 | 498 | 965 |
| | 87 | — | — | 0.5 | 3 | 0.7 | 0.5 | 0.5 | 0.4 | — | Remainder | 2.4 | 1.4 | 2.5 | 2177 | 519 | 996 |
| | 88 | 2 | 1 | 0.5 | — | 0.7 | 1.0 | 0.05 | — | 0.4 | Remainder | 8.4 | 2.1 | 4.2 | 2109 | 462 | 823 |
| | 89 | 2 | — | 1 | 0.5 | 0.7 | 0.5 | 0.1 | 0.3 | 0.2 | Remainder | 8.7 | 2.3 | 3.1 | 2100 | 457 | 865 |
| | 90 | 2 | 1 | — | 0.5 | 0.7 | 0.5 | 0.2 | 0.5 | — | Remainder | 5.4 | 1.8 | 2.8 | 2138 | 483 | 990 |
| | 91 | — | 1 | 0.5 | 1 | 0.2 | 0.5 | 0.3 | — | 0.5 | Remainder | 3.0 | 1.1 | 2.6 | 2194 | 503 | 843 |
| | 92 | 1 | 0.5 | 0.5 | 0.5 | 0.7 | 0.5 | 0.5 | 0.2 | 0.3 | Remainder | 2.5 | 1.5 | 2.5 | 2198 | 522 | 870 |
| Comp. Ex.2 | | — | — | — | — | * 0.7 | — | — | — | — | Reminder | 54.0 | — | — | 891 | 253 | 270 |

In Table 6, :* means Ni phase

As is shown in Tables 3 to 6, it was confirmed that a Ni phase or a Ni—Co/Fe alloy phase and a Y₂O₃ phase do not exist at boundaries of the W phase in the comparative W-based sintered material, and the comparative W-based sintered material had a texture comprising the large W phase having the largest particle diameter of 40 μm or more, and that the W-based sintered material of the present invention had a texture comprising the fine W-M alloy phase which had the largest particle diameter of 30 μm or less which was harder than the W phase, and the Ni phase or the Ni—Co/Fe alloy phase were distributed. Therefore, it is clear that the molds 33 to 92 made of the W-based sintered material have excellent glass corrosion resistance, and high melting point, high thermal conductivity (exoergic property), and a low thermal expansion coefficient, and higher strength and hardness compared with the comparative mold 2 made of the comparative W-based sintered material. In addition, it is also clear that since the mold of the present invention has such excellent properties, when the molds of the present invention are used for hot press molding quartz glass, which requires a high molding temperature such as 1,100° C., the mold absolutely maintains excellent surface of the cavity for a long time, and has a long life time.

In addition, it is clear that when the hot press mold made of the W-based sintered material of the present invention is used for hot press molding optical glass lenses made of silicate glass or borate glass, which has relatively weak causticity, the mold absolutely maintains excellent surface of the cavity for a long time. It is also clear that even when the mold of the present invention is used for hot press molding hexafluorosilicate glass having remarkably high causticity or quartz glass needing a high molding temperature such as 1,100° C. to produce thin and small-sized optical glass lenses, the mold also absolutely maintains excellent surface of the cavity for a long time, and has a long life time.

INDUSTRIAL APPLICABILITY

The first W-based sintered material of the present invention has a texture in which the Ni phase or the Ni—Co/Fe alloy phase and the Y₂O₃ phase which have the largest particle diameter of 5 μm or less are distributed at boundaries of the W phases, and in which the largest particle diameter of the W phase is 30 μm or less. Therefore, the first W-based sintered material of the present invention has the following excellent properties.
(a) a melting point in a range from 1,800 to 2,000° C.,
(b) a thermal conductivity in a range from 90 to 150 W/m·K,
(c) a thermal expansion coefficient in a range from $4.5 \times 10^{-6}$ to $5.5 \times 10^{-6}$/K
(d) a compressive strength in a range from 1,350 to 2,000 MPa, and
(e) Vickers hardness (Hv) in a range from 320 to 450.

Therefore, when a hot press mold made at least partly of the first W-based sintered material is used for hot press molding small-sized and thin optical glass lenses made of hexafluorosilicate glass having remarkably high causticity or quartz glass needing a high molding temperature such as 1,100° C., it is possible to maintain excellent properties for a long time.

The second W-based sintered material of the present invention has a texture in which the hard W-M alloy phases are sinter-bonded, the fine Ni phase or Ni—Co/Fe alloy phase and the Y₂O₃ phase which have the largest particle diameter of 5 μm or less are distributed at boundaries of the W-M alloy phases, and in which the largest particle diameter of the W-M alloy phase is 30 μm or less. Therefore, the second W-based sintered material of the present invention has the following excellent properties.
(a) a melting point in a range from 1,800 to 2,000° C.,
(b) a thermal conductivity in a range from 70 to 130 W/m·K,
(c) a thermal expansion coefficient in a range from $4.8 \times 10^{-6}$ to $6.2 \times 10^{-6}$/K
(d) a compressive strength in a range from 1,400 to 2,000 MPa, and
(e) Vickers hardness (Hv) in a range from 350 to 550.

Therefore, when a hot press mold made at least partly of the second W-based sintered material is used for hot press molding small-sized and thin optical glass lenses made of hexafluorosilicate glass having remarkably high causticity or quartz glass needing a high molding temperature such as 1,100° C., it is possible to maintain excellent properties for a long time.

The invention claimed is:

1. A tungsten-based sintered material having high strength and high hardness comprising nickel (Ni) in a range from 0.2 to 1.5% by mass, yttrium oxide ($Y_2O_3$) in a range from 0.1 to 1% by mass, and vanadium carbide (VC) in a range from 0.05 to 0.5% by mass, the balance being tungsten (W); wherein tungsten phases are sinter-bonded;

fine nickel phase and yttrium oxide phase which have a largest particle diameter of 5 μm or less are distributed at boundaries of the tungsten phases; and a largest particle diameter of the tungsten phase is 20 μm or less.

2. A tungsten-based sintered material having high strength and high hardness comprising: nickel (Ni) in a range from 0.2 to 1.5% by mass, yttrium oxide ($Y_2O_3$) in a range from 0.1 to 1% by mass, and at least one of cobalt (Co) and iron (Fe) in a range from 0.01 to 0.5% by mass, the balance being tungsten (W); wherein tungsten phases are sinter-bonded;

any one of fine Ni—Co alloy phase, Ni—Fe alloy phase, and Ni—Co—Fe alloy phase which have a largest particle diameter of 5 μm or less and yttrium oxide phase which has a largest particle diameter of 5 μm or less are distributed at boundaries of the tungsten phases; and a largest particle diameter of the tungsten phase is 30 μm or less.

3. A tungsten-based sintered material having high strength and high hardness comprising: nickel (Ni) in a range from 0.2 to 1.5% by mass, yttrium oxide ($Y_2O_3$) in a range from 0.1 to 1% by mass, vanadium carbide (VC) in a range from 0.05 to 0.5% by mass, and at least one of cobalt (Co) and iron (Fe) in a range from 0.01 to 0.5% by mass, the balance being tungsten (W); wherein tungsten phases are sinter-bonded;

any one of fine Ni—Co alloy phase, Ni—Fe alloy phase, and Ni—Co—Fe alloy phase which have a largest particle diameter of 5 μm or less and yttrium oxide phase which has a largest particle diameter of 5 μm or less are distributed at boundaries of the tungsten phases; and a largest particle diameter of the tungsten phase is 20 μm or less.

4. A tungsten-based sintered material having high strength and high hardness comprising: nickel (Ni) in a range from 0.2 to 1.5% by mass, yttrium oxide ($Y_2O_3$) in a range from 0.1 to 1% by mass, and at least one of molybdenum (Mo), chromium (Cr), niobium (Nb), and rhenium (Re): 0.5 to 4%; the balance being tungsten (W); wherein W-M alloy phases (wherein M denotes at least one of Mo, Cr, Nb, and Re) are sinter-bonded;

any one of fine Ni phase having a largest particle diameter of 5 μm or less and yttrium oxide phase having a largest particle diameter of 5 μm or less are distributed at boundaries of the W-M alloy phases; and a largest particle diameter of the W-M alloy phase is 30 μm or less.

5. A tungsten-based sintered material having high strength and high hardness comprising: nickel (Ni) in a range from 0.2 to 1.5% by mass, yttrium oxide ($Y_2O_3$) in a range from 0.1 to 1% by mass, at least one of molybdenum (Mo), chromium (Cr), niobium (Nb), and rhenium (Re): 0.5 to 4%; and vanadium carbide (VC) in a range from 0.05 to 0.5% by mass, the balance being tungsten (W); wherein W-M alloy phases (wherein M denotes at least one of Mo, Cr, Nb, and Re) are sinter-bonded;

any one of fine Ni phase having a largest particle diameter of 5 μm or less and yttrium oxide phase having a largest particle diameter of 5 μm or less are distributed at boundaries of the W-M alloy phases; and a largest particle diameter of the W-M alloy phase is 15 μm or less.

6. A tungsten-based sintered material having high strength and high hardness comprising: nickel (Ni) in a range from 0.2 to 1.5% by mass, yttrium oxide ($Y_2O_3$) in a range from 0.1 to 1% by mass, at least one of molybdenum (Mo), chromium (Cr), niobium (Nb), and rhenium (Re): 0.5 to 4%; and at least one of cobalt (Co) and iron (Fe) in a range from 0.01 to 0.5% by mass, the balance being tungsten (W); wherein W-M alloy phases (wherein M denotes at least one of Mo, Cr, Nb, and Re) are sinter- bonded;

any one of fine Ni-Co alloy phase, Ni-Fe alloy phase, and Ni-Co-Fe alloy phase which have a largest particle diameter of 5 μm or less and yttrium oxide phase which has a largest particle diameter of 5 μm or less are distributed at boundaries of the tungsten phases; and a largest particle diameter of the W-M alloy phase is 30 μm or less.

7. A tungsten-based sintered material having high strength and high hardness comprising: nickel (Ni) in a range from 0.2 to 1.5% by mass, yttrium oxide ($Y_2O_3$) in a range from 0.1 to 1% by mass, at least one of molybdenum (Mo), chromium (Cr), niobium (Nb), and rhenium (Re): 0.5 to 4%; vanadium carbide (VC) in a range from 0.05 to 0.5% by mass, and at least one of cobalt (Co) and iron (Fe) in a range from 0.01 to 0.5% by mass, the balance being tungsten (W); wherein W-M alloy phases (wherein M denotes at least one of Mo, Cr, Nb, and Re) are sinter- bonded;

any one of fine Ni phase having a largest particle diameter of 5 μm or less and yttrium oxide phase having a largest particle diameter of 5 μm or less are distributed at boundaries of the W-M alloy phases; and a largest particle diameter of the W-M alloy phase is 15 μm or less.

8. A hot press mold for optical glass lenses composed at least partly of the tungsten-based sintered material according to any one of claims 1 to 7.

* * * * *